United States Patent [19]
Guzman

[11] 3,955,455
[45] May 11, 1976

[54] RING CUTTING DEVICE

[76] Inventor: Jesus Guzman, 1028 El Camino Drive, Costa Mesa, Calif. 92636

[22] Filed: Dec. 10, 1973

[21] Appl. No.: 423,077

[52] U.S. Cl. ................................ 83/409.1; 29/8; 83/54; 83/411 R; 83/459; 83/473
[51] Int. Cl.² .................. B26D 1/16; B26D 5/06; B26D 7/06
[58] Field of Search ............... 83/411 R, 54, 409.1, 83/459, 733, 473; 29/8

[56] References Cited
UNITED STATES PATENTS

| | | | |
|---|---|---|---|
| 748,476 | 12/1903 | Bryce | 83/459 X |
| 826,785 | 7/1906 | Hormby | 83/409.1 X |
| 1,019,720 | 3/1912 | Morrissey | 83/409.1 |
| 1,448,472 | 3/1923 | Thompson | 83/409.1 |
| 1,482,323 | 1/1924 | Sanders | 83/409.1 |
| 2,245,868 | 6/1941 | Melby | 83/409.1 |
| 3,509,789 | 5/1970 | Dye | 83/459 X |
| 3,810,405 | 5/1974 | Oberloier | 83/411 R X |

Primary Examiner—Frank T. Yost
Attorney, Agent, or Firm—Auslander & Thomas

[57] ABSTRACT

A rotatable work holder is used to automate the cutting of rings against fixed blades.

10 Claims, 14 Drawing Figures

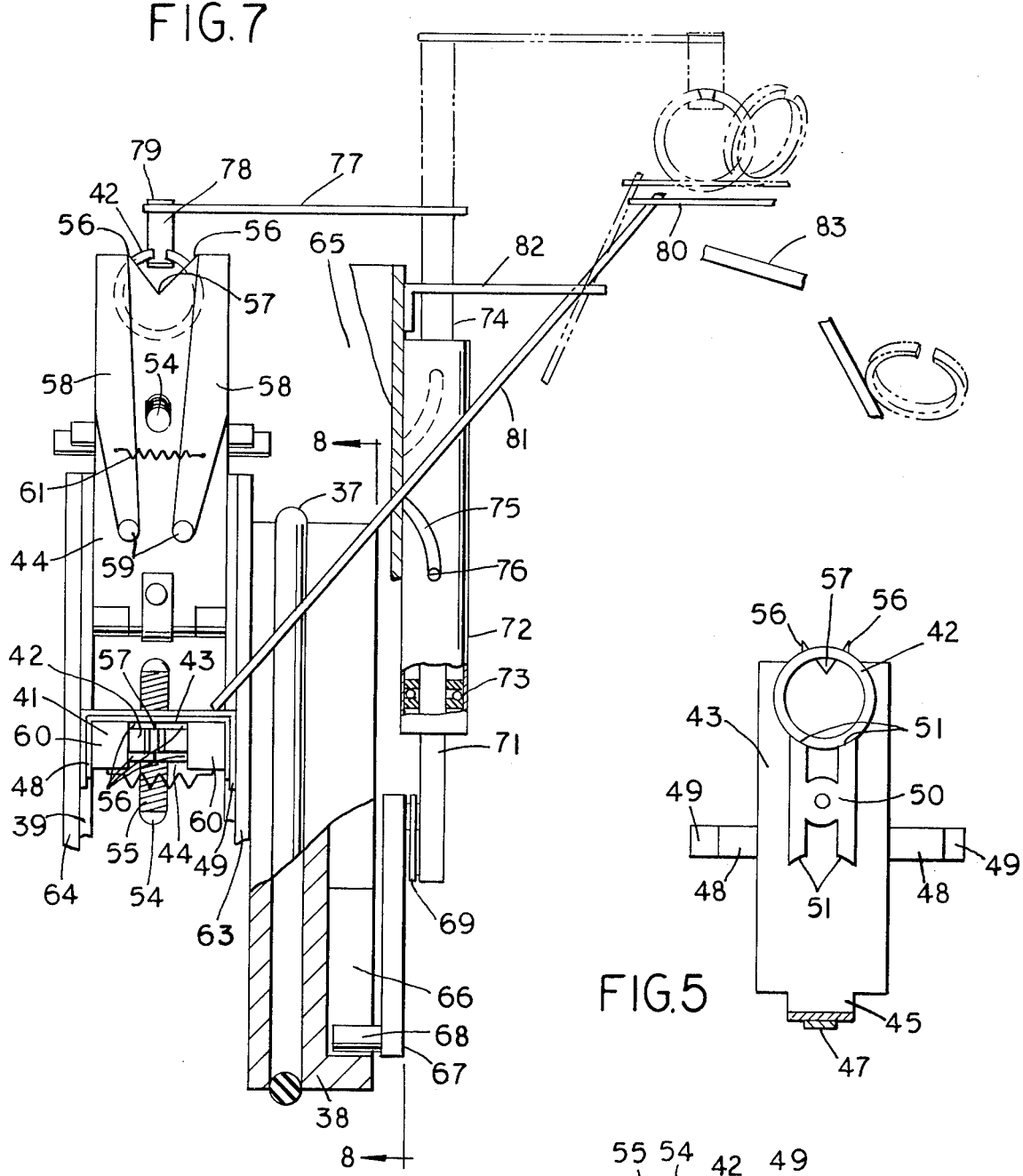

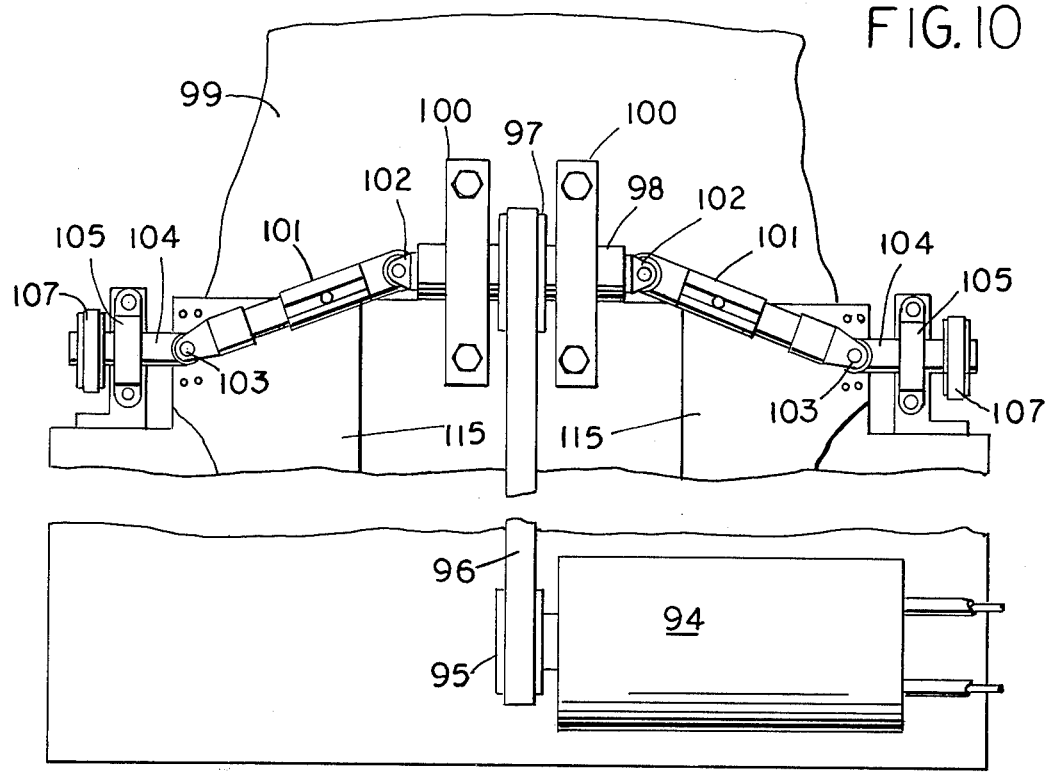
FIG. 10
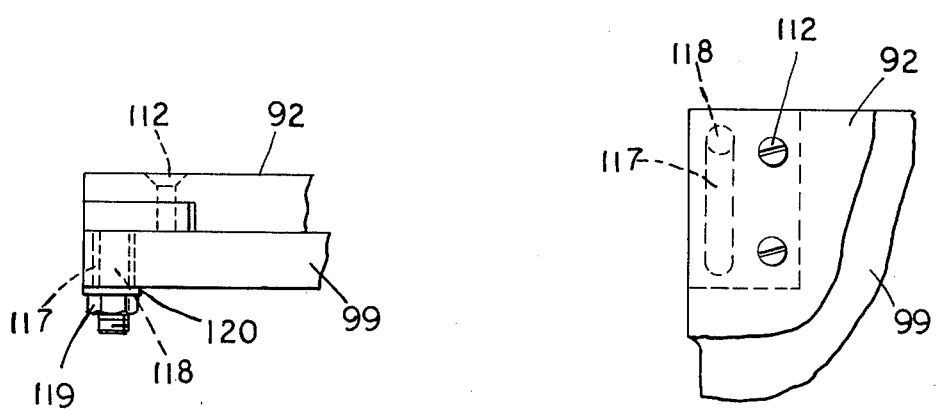
FIG. 14
FIG. 13

RING CUTTING DEVICE

The present invention relates to a ring cutting device.

In the manufacture of rings with stones, the stones are oftentimes held in a basket or box which protrudes from the circumference of the ring. In manufacturing such rings, a circular ring is often used. By cutting out an angulated portion of a round ring shaped equal to the taper and size of the basket or box, the box is then soldered into the opening in the ring to form a unitary ring and box.

Since many rings are of precious metals, it is important to make an accurate cut to avoid waste of metal or waste of labor in filing cut rings to proper size and shape and to avoid ruining good rings.

In the past machines have been preset with blades at selected angles and with selected spacing. Rings were then set on a mandrel one at a time and passed between the cutting blades. Each size requiring its own setup and rings were cut one at a time.

According to the present invention an adjustable ring cutting machine is provided with a means for successively cutting a plurality of rings sequentially with continuous movement and optionally including adjustability for various sizes and spaces to be cut in a ring.

Although such novel feature or features believed to be characteristic of the invention are pointed out in the claims, the invention and the manner in which it may be carried out, may be further understood by reference to the description following and the accompanying drawings.

FIG. 5 is an inside front detail of one of the clamp arms of FIG. 3.

FIG. 6 is a detail of a clamp of the present invention engaging a ring for cutting.

FIG. 7 is a detail of a cut ring removal mechanism of the present invention.

FIG. 10 is a partial bottom plan view of FIG. 9.

FIG. 13 is a plan detail of a pivot showing an adjustment slot in the base plate.

FIG. 14 is an elevation of FIG. 13.

Referring now to the figures in greater detail, where like reference numbers denote like parts in the various figures.

Figure 1:
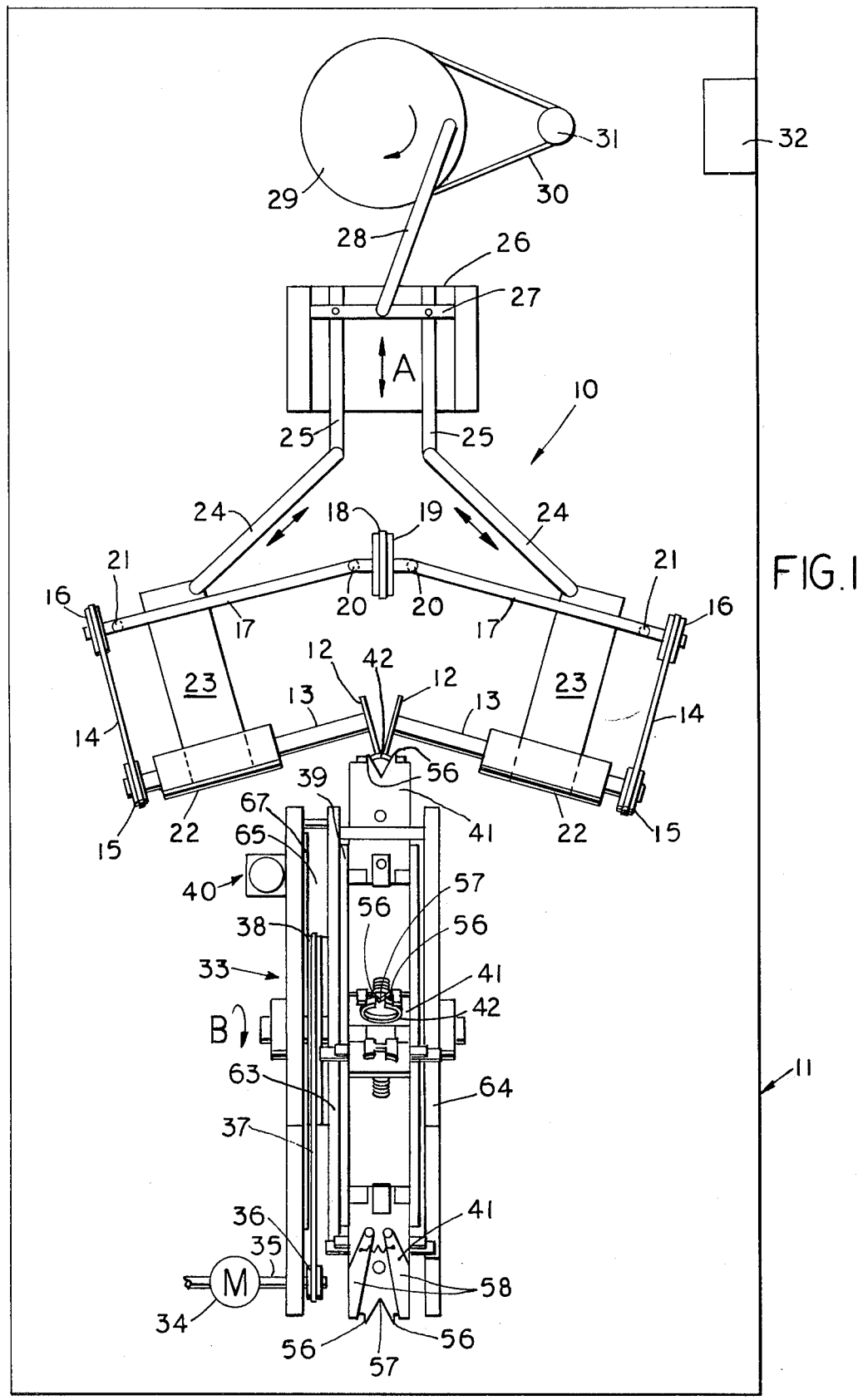
FIG. 1 is a plan view of a ring cutting device of the present invention.

The ring cutting device 10 as shown in FIG. 1 is set up on a base plate 11. Cutting blades 12 held at selected fixed angles rotate on shafts 13.

The shafts 13 are driven by belts 14 on the shaft pulleys 15 from drive pulleys 16 on the drive shaft 17.

The drive shaft 17 is driven by a belt 18 on a pulley 19 from a pulley and motor below the base plate 11 (not shown).

The drive shaft 17 has two sets of universal joints 20, 21 so that as will be later shown, adjustment of the blade 12 angle can be accomplished.

The blade shafts 13 are held in a support bearing 22 mounted on pivot plates 23, which are like pivotable platforms on the base plate 11.

The pivot plates 23 or platform have pivot arms 24 attached to linkage arms 25, slideable in the direction of arrow A in the guide slot 26.

The linkage arms 25 are joined by a link bar 27 which has a centrally located drive arm 28 which is eccentrically rotatably mounted on a drive wheel 29, driven by a belt 30, attached to a pulley 31 driven by a motor (not shown).

The turning of the drive wheel 29 changes the angle of the blades 12 without affecting the drive of the shaft 17 because of the universal sets 20, 21 on the drive shaft 17.

The linkage arms 25 move either forward or backward, spreading or retracting, depending upon the position of the drive wheel 29 and the eccentrically mounted drive arm 28.

An angle select mechanism 32 actuates the motor (not shown) to rotate the drive wheel 29 to stop at a point that leaves the blades 12 at a selected angle.

The blades 12 are juxtaposed to a ferris wheel or rotatable work holding structure construction 33 which is driven to the direction of arrow B by a motor 34 with a shaft 35 to a pulley 36. A belt 37 drives a larger pulley 38 which rotates the ferris wheel 39.

The pulley 38 also operates the ring take-off construction 40 which is shown schematically in FIG. 1.

The ferris wheel 39 has a plurality of ring clamps 41 mounted in it which close to hold a ring 42 firmly locked as it passes the blades 12 and is cut.

Figure 2:
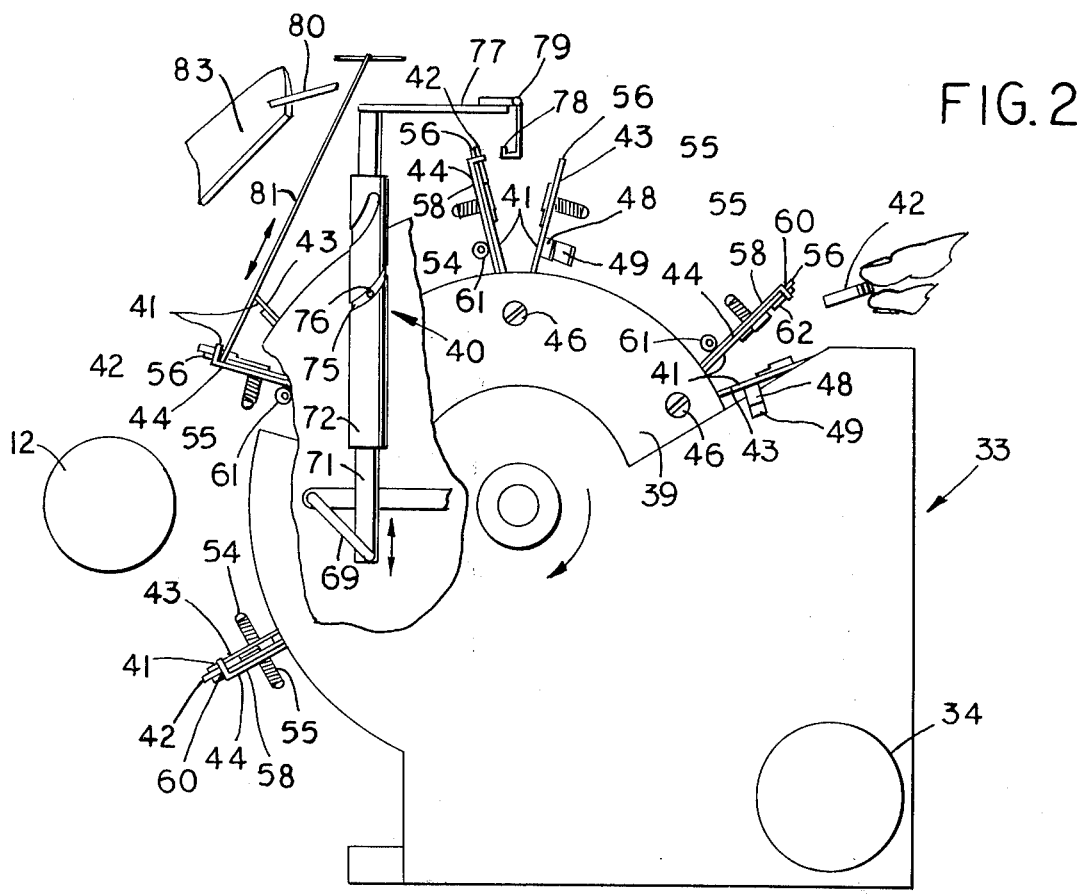
FIG. 2 is a side elevation of the ferris wheel of the present invention.

In FIG. 2 the ferris wheel construction 33 is shown in some detail. The clamps 41 comprise a first part 43 and a second part 44 which clamp the ring 42 and a ring take-off construction 40 is shown in some detail.

The clamp parts 43, 44, as shown in FIGS. 2–6 are joined by a hinge 45 which is pivotally mounted by pivots 46 which pass through the ferris wheel 39. The two parts 43, 44 of the clamp 41 are biased apart by a spring 47.

The first part 43 of the clamp 41 is provided with a pair of leaf springs 48, 49, one spring 48 is shorter than the second spring 49. Both springs extend across the back of the clamp part 43 and both springs 48, 49 are longer in length than the width of the ferris wheel construction 33.

Figure 4:
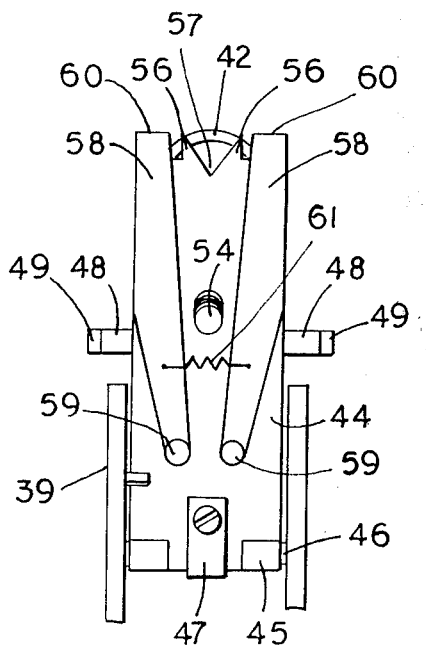
FIG. 4 is a front elevation view of the clamp of FIG. 3.
Figure 3:
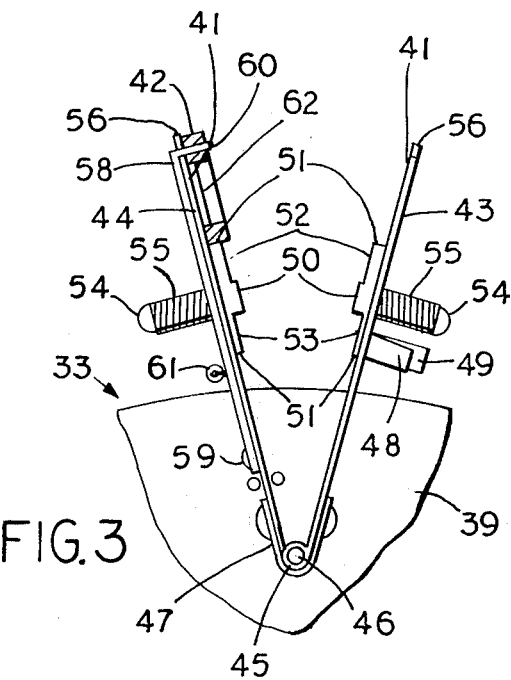
FIG. 3 is a side detail of a ring clamp of FIG. 2.

Each clamp part 43, 44 has a ring thickness selector 50. In FIGS. 4 and 5 it can be seen that the edges 51 of the thickness selector cradle a ring 42.

The ring thickness selector 50, as shown, has two thicknesses 52, 53 and a knob 54 passing through the wall of the ring clamp parts 43, 44. The thickness selectors 50 are biased by a spring 55 to hold them taut in their positions inside the clamp 41 with their spacing cradling the selected thickness of ring 42.

Each of the clamp parts 43, 44 has stops 56 separated by a V cutout 57. The second clamp part 44 also includes a pair of arms 58 mounted on pivots 59. The arms 58 have fingers 60 at about a ring angle to the plane of the arms 58 which override the ends of the second clamp part 44. As can be seen in FIG. 6, the fingers also cover the end of the first clamp part 43.

The arms 58 are biased by a spring 61 to be normally spread apart.

The second clamp part 44 has a round ring holder 62, usually thinner than any ring 42 anticipated to be cut.

The clamp portion 43 closes against the bias of the spring 47 as the ferris wheel 39 rotates the clamp portions 43, 44 into contact with walls 63, 64 of the chamber 65 within which the ferris wheel 39 rotates. The leaf springs 48, 49 close the arms 58 against the bias of the spring 61 toward the stops 56 on the second portion 44 of the clamp 41 with the fingers 6 overriding the first portion 43 of the clamp 41 holding a ring 42 firmly in place.

The cut ring 42 is removed by the ring take-off construction 40.

Figure 8:
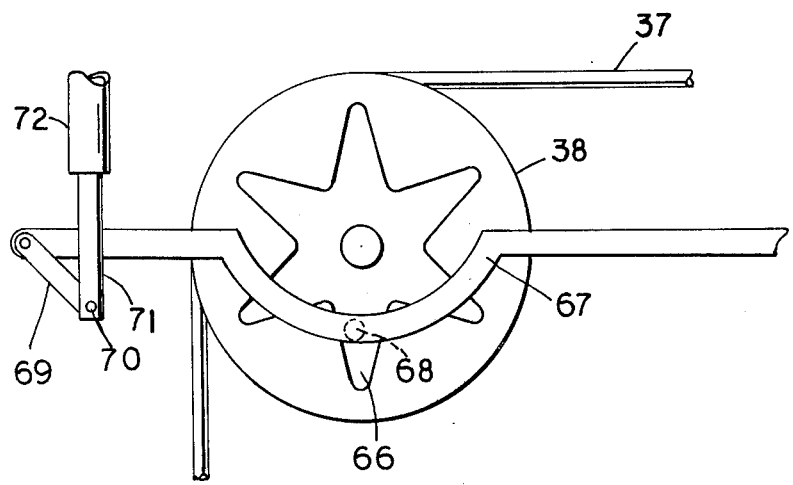
FIG. 8 is a section of FIG. 7 at lines 8—8 showing the lever and gear mechanism of FIG. 7.

The ferris wheel 39 is driven by a belt 37 over a large pulley 38 mounted within the chamber 65. The pulley 38 includes an integral star gear 66 as shown in FIGS. 7 and 8. A lever arm 67 has a bearing 68 protruding into the star gear 66 as a follower, thus intermittantly moving the lever arm 67 up and down.

A construction 69 at the end of the lever arm 67 has a hinge 70 connected to a piston 71. The piston is held in a cylinder 72 which has a spiral gear race 75 along part of its length.

The piston 71 inside cylinder 72 has a thrust bearing 73 at its end. A moveable shaft 74 rests in the cylinder 72, against the thrust bearing 73. A bearing 76 on the shaft 74 rides in the race 75 alternatingly elevating and turning the shaft 74 and returning and turning the shaft 74 as the construction 69 oscillates the lever arm 67 following the bearing 68 as the star gear 66 moves.

The shaft 74 is topped by a horizontal arm 77 to which is attached at its end a substantially L shaped grasping finger 78 which has a hinge 79 to grasp a ring 42 as it is held in the open second portion 44 of the clamp 41 after the ring 42 is cut. The ring 42 rests on the ring holder 62.

When the arm 77 is in its outward position with a ring 42 held by the grasping finger 78, the ring 42 is removed by a moveable platform 80 which includes a support rod 81 integral to the platform 80 and its rod 81. They are held by an angle bar 82 through which the rod 81 passes. The other end of the rod 81 rests upon an upmoving ring clamp 41.

The up movement of the platform 80 tilts the ring 42 off the finger 78 and drops it into a chute 83 for delivery, by gravity, to a storage area (not shown).

In another embodiment of the present invention, as shown in FIGS. 9–13, the cutting blades 12 held in bearings 90 are supported by stantions 91, which are mounted on pivot plates 92. The drive, as can be seen in FIG. 10, is beneath the base.

Figure 9:
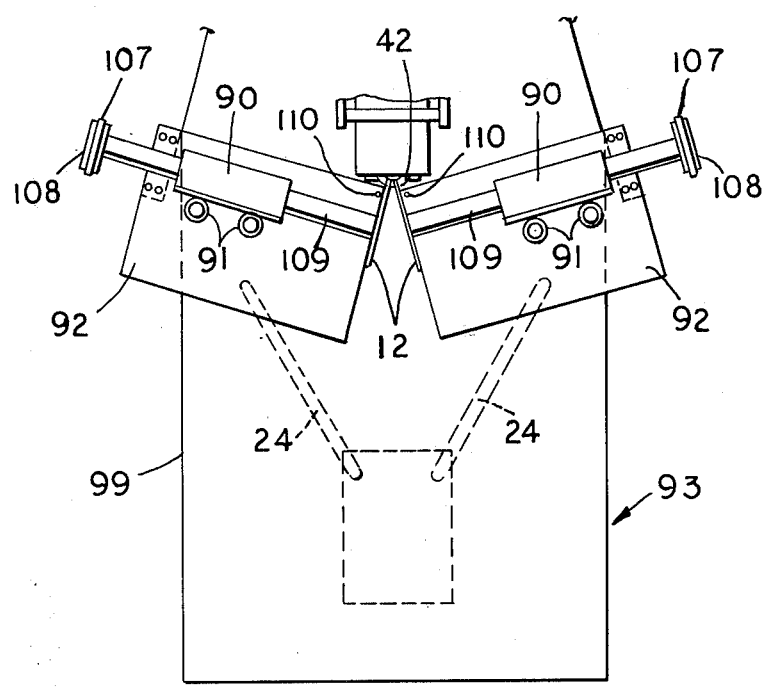
FIG. 9 is a plan view of a modification of the ring cutting device of FIG. 1.
Figure 11:
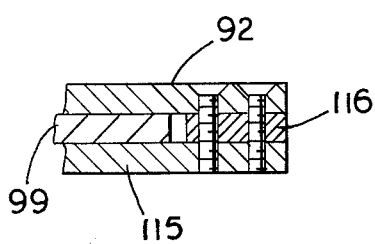
FIG. 11 is a detail of a section of a sandwich grip for a pivot plate of FIG. 9.

The ring cutting device 93 as shown in FIGS. 9 and 10 has its blades 12 driven by a motor 94 having a pulley 95 with a belt 96 driving a second pulley 97 with a shaft 98 mounted on the base 99 and held in bearings 100.

Each shaft has a drive rod 101 which is interslideable to extend and retract. Both ends of the rods 101 have universal connections 102, 103 with one set of universal connectors 102 attached to the shaft 98 and the other universal connectors 103 connected to shafts 104 mounted in the bearings 105 mounted on the base plate 99. Each shaft 104 has a pulley 106 having a drive belt 107 leading to the pulleys 108 which are mounted on the shafts 109 which hold the blades 12.

The pivot plates 92, like platforms, pivot from points 110 aligned with the forward cutting edges of the blades 12.

Figure 12:
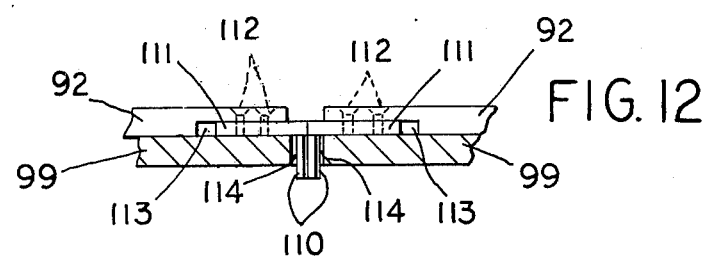
FIG. 12 is a section showing the pivot of the pivot plate of FIG. 9.

As shown in FIG. 12, pivot inserts 111 are attached by screws 112 in cutouts 113 in the pivot plates 92 in such a manner as to maintain the pivot plates 92 and the pivot inserts 111 all flush to the base 99. The base plate 99 has openings 114 through which the pivot points 110 are held.

The means for changing the blade angle in the embodiment of FIGS. 9 through 12 is substantially the same as shown in FIG. 1, except the pivot arms 24 (not shown in FIG. 10) are attached to sandwich plates 115 under the base 99 which are spaced apart by spacers 116 which allow the sandwich of the pivot plates 92, spacer 116 and sandwich plates 115 to move smoothly over the base plate 99 when the angle of the blades 12 is changed by the angle arm 24 (not shown in FIG. 10).

Spacing adjustment of the blades 12 as distinguished from angle adjustment may be provided for as shown in FIGS. 13 and 14. The base plate 99 has slots 117 within which the pivot point 118 may be set with a nut 119 against a washer 120, as can be seen in FIG. 13.

In operation, a ring 42 is placed on the first part 43 of the ring clamp 41 as indicated in FIG. 2. The ring 42 is positioned, oftentimes over the edges 51 of the ring thickness selector 50. As the clamp 41 rotates into the chamber 65, the leaf springs 48, 49 are bent inward against the edges 51 of the chamber walls 63, 64. The movement of the first clamp part 43 is first impeded by the interaction of the walls 63, 64 and springs 48, 49, thus the second part of the clamp 44 in its continuous movement closes down upon the ring 42. The ring holder 62 engages the ring and centers it for cutting. The other thickness selector 50 grasps the ring at the selected positioned thicknesses 52, 53 and firmly holds the ring.

The continued rotation of the ferris wheel 39 causes the leaf spring 48, 49 to be pulled into the chamber 65 between the walls 63, 64, folding or curling the springs 48, 49 about the arms 58, closing them. The fingers 60 also cover the end of the first part of the clamp 43. Usually the arms 58 are not brought inward as far as the stops 56, but are stopped by the ring 42 itself.

The tightly held ring 42 in the clamp 41 is rotated in the path of the fixed position of the blades 12, past the fixed position of the blades 12 as can be seen in FIGS. 1 and 2 and the selected position, preferably smaller than the size of the clamp's 41 v 57 is cut out. The clamp 41 then passes beyond the chamber 65. The ring 42 is retained on the ring holder 62 which is less than the thickness of the usual ring 42 to be cut. The spring 47 is now free to separate the first and second parts 43, 44 of the clamp 41.

As the second part of the clamp 44 nears the top of the ferris wheel 39, the arm 77 holds the grasping finger 78 juxtaposed to the upper portion of the cut ring 42. The movement and the ability of the grasping finger 78 to swing backward on its hinge 79 causes the finger 78 to grasp the ring 42 of the ring holder 62.

The upstroke of the lever arm 67 riding on the bearing 68 in the star gear 66 actuates the piston 71, forcing the shaft 74 upward moving against the thrust bearing 73 and being rotated by the shaft's 74 bearing 76 in the gear race 75 in the cylinder 72.

The arm 77 with the ring 42 held in the grasping finger 78 is thus rotated over the platform 80 which is pushed upward by the movement of the rod 81 which is in contact with another clamp 41 on the ferris wheel 39. The upward action of the platform 80 tilts the ring 42 off the grasping finger 78 and into the chute 83 where it is led to a storage area (not shown).

The rod 81 drops off the clamp 41 as it rises and falls to the next clamp 41 on the ferris wheel 39. The star gear 66 with the lever arm 67 and bearing 68 follower enters a downstroke, reversing all the movements of the upstroke and prepares the grasping finger 78 to retrieve another cut ring 42.

The angle selector 32 is a control for a motor (not shown) which rotates the blades 12 of FIG. 1 or FIG. 9 to the angle selected for the particular ring or ring batch.

Wider cuts may be adjusted by use of adjustments of the pivots 118 in the slots 117.

Whereas in FIG. 9 the blades 12 are mounted on pivot plates 92, it is essential that the pivot points 110 be directly beneath the cutting blades 12, thus any angular adjustment of the pivot plates 92 will always leave the blades 12 still tangent to the same portion of the ring 42 as before.

In FIG. 1 the adjustment must carry out the same effect for best efficiency.

The use of the construction of FIG. 1 or of FIG. 9 is optional.

It should be noted that at least the leaf spring 49 tends to stabilize the clamp 41 when in the chamber 65 against any torsional movement.

The terms and expressions which are employed are used as terms of description; it is recognized, though, that various modifications are possible.

Having thus described certain forms of the invention in some detail, what is claimed is:

1. A ring cutting device comprising a spaced pair of rotatable cutting blades, means to rotate said cutting blades, said cutting blades each mounted on a moveable platform and moveable a selected equal distance, each said moveable platform including a hinged arm and means attached to said hinged arm adapted to spread and retract said arm to select angles for said cutting blades, a rotatable work holder, means to rotate said rotatable work holder, said rotatable work holder including at least one ring clamp, said at least one ring clamp hinged to said rotatable work holder including at least one ring clamp, said at least one ring clamp hinged to said rotatable work holder and having a first and second part, means to close said first and second ring clamp parts engaging a ring, and said rotatable work holder spaced to rotate said ring in said ring clamp over a selected path by said cutting blades.

2. The invention of claim 1 wherein said means to spread and retract said arms include a pulley with a drive arm eccentrically mounted on said pulley.

3. The invention of claim 2 including means to select fixed positions for said pulley.

4. The invention of claim 3 wherein each said moveable platform is a plate, said plate mounted on a base, said plate extending beyond the edge of said base, a sandwich plate and a spacer about the thickness of said base all joined to said platform beyond the edge of said plate, and said hinged arms are attached to said sandwich plate.

5. The invention of claim 1 wherein said first and second portions of said ring clamp are normally biased apart.

6. The invention of claim 5, wherein at least one of said ring clamp portions includes a pair of arms including fingers overriding the ends of said first and second parts of said ring clamp.

7. The invention of claim 6 wherein said ring clamp portion of said rotatable work holder is rotatable in a chamber in said work holding structure.

8. The invention of claim 7 wherein said ring clamp structure includes at least one leaf spring on one portion of said ring clamp structure, said leaf spring of greater width than said rotatable work holding structure chamber.

9. The invention of claim 8 wherein said leaf spring when in said rotatable work holding structure enfolds the ends of said ring clamp arms against the normal bias of said ring clamp arms and is adapted to hold a ring emplaced therein.

10. The invention of claim 9 wherein at least one of said ring clamp portions further includes a ring holder.

* * * * *